United States Patent
Hasegawa et al.

(10) Patent No.: US 9,045,659 B2
(45) Date of Patent: Jun. 2, 2015

(54) INKJET RECORDING INK AND INKJET RECORDING DEVICE USING THE SAME

(75) Inventors: Shin Hasegawa, Shizuoka (JP); Hiroyuki Fushimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 13/643,841

(22) PCT Filed: Apr. 8, 2011

(86) PCT No.: PCT/JP2011/059329
§ 371 (c)(1),
(2), (4) Date: Oct. 26, 2012

(87) PCT Pub. No.: WO2011/136037
PCT Pub. Date: Nov. 3, 2011

(65) Prior Publication Data
US 2013/0038660 A1 Feb. 14, 2013

(30) Foreign Application Priority Data
Apr. 30, 2010 (JP) ................. 2010-104730

(51) Int. Cl.
| | | |
|---|---|---|
| B41J 2/01 | (2006.01) | |
| C09D 11/324 | (2014.01) | |
| C09D 11/322 | (2014.01) | |
| B41J 2/175 | (2006.01) | |
| C09D 11/326 | (2014.01) | |

(52) U.S. Cl.
CPC ............ *C09D 11/324* (2013.01); *C09D 11/322* (2013.01); *B41J 2/17503* (2013.01); *C09D 11/326* (2013.01)

(58) Field of Classification Search
CPC .............. B41J 2/01; B41J 2/21; B41J 2/2107; B41J 2/17503; C09D 11/30; C09D 11/32; C09D 11/322; C09D 11/324; C09D 11/40; C09D 11/326
USPC .......... 347/21, 28, 95–100, 86; 523/160, 161; 106/31.13, 31.6
See application file for complete search history.

(56) References Cited

U.S. PATENT DOCUMENTS

| | | | |
|---|---|---|---|
| 5,085,698 A | 2/1992 | Ma et al. | |
| 5,172,133 A | 12/1992 | Suga et al. | |
| 5,221,334 A | 6/1993 | Ma et al. | |
| 5,571,311 A | 11/1996 | Belmont et al. | |
| 6,143,807 A | 11/2000 | Lin et al. | |
| 6,710,022 B1 | 3/2004 | Kwetkat et al. | |
| 6,740,152 B1 | 5/2004 | Fukuda | |
| 6,758,559 B1 | 7/2004 | Nakano et al. | |
| 7,101,919 B2 | 9/2006 | Hasegawa et al. | |
| 7,798,629 B2 | 9/2010 | Hakiri et al. | |
| 2003/0008080 A1 | 1/2003 | Doi et al. | |
| 2003/0196571 A1 | 10/2003 | Hakiri et al. | |
| 2004/0077749 A1 | 4/2004 | Yatake | |
| 2005/0228069 A1 | 10/2005 | Kataoka et al. | |
| 2005/0272834 A1* | 12/2005 | Ikegami et al. | 523/160 |
| 2006/0209149 A1 | 9/2006 | Hasegawa et al. | |
| 2006/0272543 A1 | 12/2006 | Hakiri et al. | |
| 2008/0036830 A1 | 2/2008 | Natori et al. | |
| 2009/0234058 A1 | 9/2009 | Sasada | |
| 2010/0277548 A1 | 11/2010 | Hakiri et al. | |
| 2010/0302306 A1 | 12/2010 | Hasegawa et al. | |
| 2010/0309260 A1 | 12/2010 | Hakiri et al. | |
| 2012/0154492 A1 | 6/2012 | Hakiri et al. | |
| 2012/0207984 A1 | 8/2012 | Hasegawa et al. | |

FOREIGN PATENT DOCUMENTS

| | | |
|---|---|---|
| CN | 101121836 A | 2/2008 |
| EP | 0688836 A2 | 12/1995 |
| EP | 1889885 A1 | 2/2008 |
| JP | 56-147871 | 11/1981 |
| JP | 05-239392 | 9/1993 |
| JP | 08-003498 | 1/1996 |
| JP | 08-081646 | 3/1996 |
| JP | 08-283633 | 10/1996 |
| JP | 08-333531 | 12/1996 |
| JP | 09-194775 | 7/1997 |
| JP | 2000-063727 | 2/2000 |
| JP | 2000-144028 | 5/2000 |
| JP | 2001-081366 | 3/2001 |
| JP | 2001-214089 | 8/2001 |
| JP | 2001-329199 | 11/2001 |
| JP | 2002-003767 | 1/2002 |
| JP | 2002-088289 | 3/2002 |
| JP | 2003-509571 | 3/2003 |
| JP | 2004-083893 | 3/2004 |
| JP | 2004-123904 | 4/2004 |
| JP | 3625595 | 12/2004 |
| JP | 2005-105227 | 4/2005 |
| JP | 2005-281691 | 10/2005 |
| JP | 2005-314528 | 11/2005 |
| JP | 2006-008858 | 1/2006 |
| JP | 2006-188626 | 7/2006 |
| JP | 2006-219584 | 8/2006 |
| JP | 2006-282781 | 10/2006 |
| JP | 2007-119551 | 5/2007 |

(Continued)

OTHER PUBLICATIONS

International Search Report Issued Jun. 14, 2011 in PCT/JP11/59329 Filed Apr. 8, 2011.
Combined Office Action and Search Report issued Sep. 4, 2013 in Chinese Patent Application No. 201180021552.5 (with English translation).

*Primary Examiner* — Matthew Luu
*Assistant Examiner* — Rut Patel
(74) *Attorney, Agent, or Firm* — Oblon, McClelland, Maier & Neustadt, L.L.P.

(57) ABSTRACT

An inkjet recording ink, which contains: carbon black; a surfactant; water; a water-soluble organic solvent; and particles formed of an anionic self-emulsifying poly(ether urethane) resin, wherein the carbon black contains first carbon black whose surface has been treated with an anionic surfactant and second carbon black which has been coated with a resinous polymer, where a mass ratio of the first carbon black to the second carbon black is 10/90 to 90/10, and wherein the anionic surfactant is a naphthalenesulfonic acid-formaldehyde condensate.

16 Claims, No Drawings

(56) References Cited

FOREIGN PATENT DOCUMENTS

| | | |
|---|---|---|
| JP | 2007-186642 | 7/2007 |
| JP | 2007-211058 | 8/2007 |
| JP | 2007-231191 | 9/2007 |
| JP | 2009-149815 | 7/2009 |
| JP | 2009-173805 | 8/2009 |
| JP | 2009-221326 | 10/2009 |
| JP | 2011-080041 | 4/2011 |
| JP | 2011-116857 | 6/2011 |
| WO | WO02/066564 | 8/2002 |
| WO | WO2004/092285 | 10/2004 |
| WO | WO2009/093751 | 7/2009 |
| WO | WO 2009081998 A1 * | 7/2009 ............ C09D 11/00 |
| WO | WO 2009093751 A1 * | 7/2009 ............ C09D 11/00 |
| WO | WO2011/030880 | 3/2011 |
| WO | WO2011/068239 A1 | 6/2011 |

\* cited by examiner

INKJET RECORDING INK AND INKJET RECORDING DEVICE USING THE SAME

TECHNICAL FIELD

The present invention relates to an inkjet recording ink and inkjet recording device, which provide images of high image density, have excellent jetting stability, and excellent storage stability of the ink.

BACKGROUND ART

Compared to other printing methods, the inkjet recording method offers ease of full-color printing since it involves a simpler process. And also, the inkjet recording method has the benefit of enabling the production of high-resolution images despite being of simple constitution.

As inkjet recording inks, dye-based inks are used in which various types of water-soluble dyes are dissolved in water or a mixture of water and an organic solvent. Such dye-based inks have a disadvantage of having poor light resistance, though they are excellent in color tone sharpness. Meanwhile, pigment-based inks in which carbon black and various types of organic pigments are dispersed are superior in light resistance compared to dye-based inks, and thus studies on pigment-based inks are being intensively made.

However, pigment-based inks are more likely to cause nozzle clogging compared to dye-based inks. Pigment inks are generally prepared as follows. A coloring material and a dispersant are preliminarily dispersed in an aqueous solvent to prepare a dispersion product. After that, the dispersion product is dispersed to a predetermined degree by a media-type disperser, followed by diluting to a predetermined concentration.

Water-based pigment inks usually contain a surfactant and a water-soluble resin to disperse a hydrophobic pigment therein, but the reliability of images obtained using such inks is extremely low. Thus, according to some disclosed techniques, film-formable resin fine particles are added into the inks in aim of improving the quality of images. However, it is difficult to keep a plurality of components in a state of being finely and stably dispersed throughout the ink for a long period of time. And so, when a dispersant such as a surfactant is used in a large amount in order to stably disperse such fine particles, a problem inconveniently occurs. Specifically, the problem, for example, is that air bubbles may be generated inside the ink tank and/or inkjet head, which could cause degradation in image quality. Likewise, in aim of improving dispersibility, research has been conducted into the effectiveness of methods that change the surface of a pigment to a hydrophilic group, or, the effectiveness of employing a resin containing a hydrophilic group. However, while a given component may be stable when used alone, combined use of several different components has problematically caused degradation of dispersion stability as well as degradation of storage stability.

PTLs 1 to 3 propose a surface-treated pigment ink, which gives excellent printing quality, and has excellent jetting stability and storage stability, or has only excellent jetting stability. PTL 4 proposes an ink set, which can maintain stable jetting performance of the ink.

To obtain high image density of a printed image, PTL 5 discloses a method in which an ink containing a water-insoluble coloring agent and charged resin quasi-particles which are smaller than particles of the coloring agent is used; PTL 6 discloses a method in which an ink containing a self-dispersible pigment whose DBP oil absorption is optimized is used; and PTL 7 discloses a method in which an aqueous dispersion liquid of carbon black containing carbon black which has been surface-modified to have HLB value of 7 to 18, and a nonionic surfactant having an acetylene skeleton in the molecular structure thereof is used. Moreover, PTL 8 discloses an aqueous ink containing an acetylene glycol-based surfactant.

For the purpose of stabilizing a dispersion state of an ink, PTL 9 discloses a method of dispersing a water-dispersible resin having a carboxyl group and a nonionic hydrophilic group in a molecule thereof in water; PTL 10 discloses a method in which polarities of a water-soluble polymer and a surfactant are both made the same, or nonions are added thereto; PTL 11 discloses a method an aqueous recording liquid is controlled so that an ionic coloring agent-containing polyester resin and hydrophilic groups of a coloring agent have the same polarity; and PTL 12 discloses a method in which a dispersed pigment and dispersed resin particles are controlled to have the same polarity. Moreover, PTL 13 discloses a printing ink using a gemini surfactant as a dispersing agent.

Furthermore, it is described in PTL 14 about an aqueous inkjet ink composition containing a pigment dispersion liquid, an aldehyde naphthalene sulfonate dispersing agent, and/or at least one sulfone solvent, where the pigment particle dispersion liquid contains pigment particles whose particle size distribution is such that at least 70% of the particles in the dispersion liquid has the diameter of less than 0.1 µm, and other particles have the diameter equal to or more than 0.1 µm. PTL 15 proposes a recording liquid formed of an aqueous medium containing a pigment, a polymeric dispersing agent and a nonionic surfactant.

Moreover, it is proposed in PTLs 16 and 17 that an AB or BAB block-copolymer is used as a dispersing agent of a pigment. It is disclosed in PTL 18 that a specific pigment, water-soluble resin and solvent are used.

As a method for dispersing a pigment without using a dispersing agent, PTL 19 discloses a method in which a substituent including a water-soluble group is introduced to carbon black; PTL 20 discloses a method in which a water-soluble monomer or the like is polymerized onto a surface of carbon black; PTL 21 discloses a method for acid-treating carbon black; and PTL 22 discloses a method in which water-resistance and jetting stability are attained by using an ink containing an acid-treated carbon black, and a terpolymer formed of acrylic acid, styrene, and α-methyl styrene.

Moreover, PTL 23 proposes an inkjet recording liquid containing dispersed particles whose average particle diameter is 30 nm to 200 nm.

Although the conventional ink liquids have succeeded to provide high image density with a color pigment ink, a black pigment ink has not achieved to provide sufficient image density and satisfactory black pigment inks have not been provided in this regard.

PTLs 24 to 26 disclose proposes an example in which beads each having a diameter of approximately 0.05 mm to approximately 1.0 mm are used for bead mill dispersion, but a dispersion stability of a resulting dispersion is not sufficient.

Moreover, PTL 27 discloses that an anionic surfactant is used as a dispersing agent, and that a molecular weight of such surfactant is preferably $1,000 \leq m \leq 30,000$. However, a resulting ink liquid does not have sufficient dispersion stability, and there are problems such that the ink liquid loses its dispersion stability in the case where a pigment that is not resistant to impacts caused during dispersion is used, and as a result the ink liquid has poor jetting stability.

CITATION LIST

Patent Literature

PTL 1: Japanese Patent Application Laid-Open (JP-A) No. 2007-186642
PTL 2: JP-A No. 2006-282781
PTL 3: JP-A No. 2005-105227
PTL 4: JP-A No. 2007-119551
PTL 5: JP-A No. 2006-008858
PTL 6: JP-A No. 2002-003767
PTL 7: JP-A No. 2006-219584
PTL 8: JP-A No. 2004-123904
PTL 9: JP-A No. 05-239392
PTL 10: JP-A No. 08-283633
PTL 11: JP-A No. 2000-063727
PTL 12: JP-A No. 2001-081366
PTL 13: Japanese Unexamined Application Publication (JP-A) No. 2003-509571
PTL 14: JP-A No. 08-333531
PTL 15: JP-A No. 56-147871
PTL 16: U.S. Pat. No. 5,085,698
PTL 17: U.S. Pat. No. 5,221,334
PTL 18: U.S. Pat. No. 5,172,133
PTL 19: U.S. Pat. No. 5,571,311
PTL 20: JP-A No. 08-081646
PTL 21: JP-A No. 08-003498
PTL 22: JP-A No. 09-194775
PTL 23: JP-A No. 2000-144028
PTL 24: JP-A No. 2005-281691
PTL 25: JP-A No. 2005-314528
PTL 26: JP-A No. 2006-188626
PTL 27: Japanese Patent (JP-B) No. 3625595

SUMMARY OF INVENTION

Technical Problem

The present invention aims at providing an inkjet recording ink and an inkjet recording device, which provide images of high image density, and have excellent jetting stability and fluid stability of the ink.

Solution to Problem

The means for solving the aforementioned problems are as follows:
<1> An inkjet recording ink, containing:
    carbon black;
    a surfactant;
    water;
    a water-soluble organic solvent; and
    particles formed of an anionic self-emulsifying poly(ether urethane) resin,
    wherein the carbon black contains first carbon black whose surface has been treated with an anionic surfactant and second carbon black which has been coated with a resinous polymer, where a mass ratio of the first carbon black to the second carbon black is 10/90 to 90/10, and
    wherein the anionic surfactant is a naphthalenesulfonic acid-formaldehyde condensate.
<2> The ink according to <1>, wherein the first carbon black has an average particle diameter ($D_{50}$) of 50 nm to 100 nm, and the second carbon black has an average particle diameter ($D_{50}$) of 100 nm to 150 nm.
<3> The ink according to any of <1> or <2>, wherein the water-soluble organic solvent is 2-ethyl-1,3-hexanediol, and an amount of the 2-ethyl-1,3-hexanediol contained in the ink is 0.1% by mass to 10% by mass.
<4> The ink according to any one of <1> to <3>, wherein the anionic self-emulsifying poly(ether urethane) resin has an acid value of 40 mgKOH/g to 120 mgKOH/g.
<5> An ink cartridge, containing:
    a container; and
    the ink recording ink as defined in any one of <1> to <4> housed in the container.
<6> An inkjet recording device, containing:
    an inkjet unit configured to apply stimuli to the inkjet recording ink as defined in any one of <1> to <4> to eject the ink as jets so as to record an image.
<7> An inkjet recording method, containing:
    applying stimuli to the inkjet recording ink as defined in any one of <1> to <4> to eject the ink as jets so as to record an image.

Advantageous Effects of Invention

The present invention solves the aforementioned various problems in the art, and provides an inkjet recording ink and an inkjet recording device, which provide images of high image density, and have excellent jetting stability and fluid stability of the ink.

DESCRIPTION OF EMBODIMENTS

The inkjet recording ink of the present invention contains carbon black, a surfactant, water, a water-soluble organic solvent, and particles each formed of an anionic self-emulsifying poly(ether urethane) resin, where the carbon black contains first carbon black whose surface has been treated with an anionic surfactant, and second carbon black which has been coated with a resinous polymer; a mass ratio of the first carbon black to the second carbon black is 10/90 to 90/10; and the anionic surfactant is a naphthalenesulfonic acid-formaldehyde condensate.

By using the first carbon black whose surface has been treated with the anionic surfactant and the second carbon black which has been coated with the resinous polymer in combination in the ink, image density of resulting images, and jetting stability and fluid stability of the ink are improved. However, it had been difficult to obtain an ink that sufficiently exhibits each effect in the image density, jetting stability and fluid stability by merely mixing the two types of carbon black.

In the present invention, the mass ratio of the first carbon black whose surface has been treated with the anionic surfactant to the second carbon black which has been coated with the resinous polymer is 10/90 to 90/10. By adjusting the mass ratio of the first carbon black to the second carbon black in such manner, all of the image density, jetting stability, and fluid stability can be desirably achieved. The mass ratio thereof is preferably 30/70 to 70/30. When the inkjet recording ink has the mass ratio of the first carbon black to the second carbon black in such preferable ratio, the jetting stability of the inkjet recording ink is further enhanced with an increase of the ratio of the first carbon black, and the image density of resulting images is further improved with an increase of the ratio of the second carbon black.

A dispersion liquid in which the first carbon black whose surface has been treated with the anionic surfactant is dispersed in water tends to cause sedimentation of particles of the carbon black. However, this can be prevented by adjusting the particle diameter of the first carbon black to the range of 50 nm to 100 nm. In the case where the first carbon black has such small particle diameters, the resulting inkjet recording ink easily penetrates into paper, which is undesirable. Therefore, the present inventors have realized to provide an inkjet recording ink which achieves all of high image density of resulting images, jetting stability of the ink, and fluid stability of the ink by adjusting the average particle diameter ($D_{50}$) of the second carbon black which has been coated with the resinous polymer to the range of 100 nm to 150 nm.

The average particle diameter ($D_{50}$) of the carbon black can be measured, for example, by means of a particle a particle size analyzer (UPA, manufactured by NIKKISO CO., LTD.) under the environment of 23° C. and 55% RH.

When the particle diameter of the first carbon black which is surface-treated with the anionic surfactant is small, i.e. the range of 50 nm to 100 nm, the dispersion stability of the ink tends to be low. To counter this problem, an aqueous polyurethane resin, and a naphthalenesulfonic acid-formaldehyde condensate, that is an anionic surfactant, are added to the inkjet recording ink. By adding these materials to the ink, excellent dispersion stability of the ink is obtained, and it is possible to achieve image density of resulting images, jetting stability of the ink, and fluid stability of the ink without impairing the dispersion stability of the ink.

Use of the particles formed of the anionic self-emulsifying poly(ether urethane) resin as the aqueous polyurethane resin can achieve to attain excellent dispersion stability, image density, jetting stability, and fluid stability.

The dispersion liquid of the first carbon black (the dispersion liquid in which the anionic surfactant and the first carbon black are dispersed in water) preferably contains 0.1 parts to 2 parts of the surfactant relative to 1 part of the first carbon black on mass basis. The more preferable amount of the surfactant in the dispersion liquid is 0.25 parts to 1 part relative to 1 part of the first carbon black. Use of the surfactant in such amount can achieve to control the average particle diameter ($D_{50}$) of the first carbon black in the aforementioned range. As a result, the inkjet recording ink providing high image density of resulting image, excellent jetting stability, and fluid stability can be provided.

When the amount of the surfactant is less than 0.1 parts relative to 1 part of the first carbon black, the aforementioned effects may not be achieved, and the dispersion liquid of the first carbon black (the dispersion liquid in which the anionic surfactant and the first carbon black are dispersed in water) and the resulting ink may have poor storage stability, which tends to cause clogging of a nozzle. When the amount of the surfactant is more than 2 parts, the viscosity of the dispersion liquid of the first carbon black and the viscosity of the resulting ink are excessively high, and thus it may be difficult to perform printing in the inkjet system using such ink.

While it is a characteristic of the present invention to use the naphthalene sulfonic acid-formalin condensate as the surfactant for treating the surface of the first carbon black, when the total amount of the dimers, trimers and tetramers of naphthalene sulfonic acid in the naphthalene sulfonic acid-formalin condensate is less than 20%, nozzle clogging tends to occur due to poor storage stability of the pigment dispersion liquid and ink as a result of degradation in dispersibility. Likewise, when the amount of the dimmers, trimers, and tetramers of naphthalene sulfonic acid in the naphthalene sulfonic acid-formalin condensate is more than 80%, dispersion becomes difficult to perform.

The dispersion liquid in which the first carbon black or the second carbon black is dispersed in water is obtained, for example, in the following manner. Specifically, the carbon black, the dispersant, water, and optionally used various additives are dispersed with a bead mill, for example, a disperser such as DYNOMILL KDL-Type (manufactured by K.K. SHINMARU ENTERPRISES CORPORATION), AGITATOR MILL LMZ (manufactured by ASHIZAWA FINETECH LTD.) or SC MILL (manufactured by MITSUI MINING K.K.). After dispersion in the bead mill, the resultant dispersion product is further dispersed with a bead-less mill, such as high-speed shearing-force-type CLEAR SS5 (manufactured by M TECHNIQUE CO., LTD), CABITRON CD1010 (manufactured by EURO TECH, LTD), MODULE DR2000 (manufactured by K.K. SHINMARU ENTERPRISES CORPORATION), thin-film rotation-type T. K. FIL-MIX (manufactured by TOKUSHUKIKAKOUGYOU K.K.), super-high pressure shock-type ALTEMIZER (manufactured by SUGINO MACHINE LTD.) or NANOMIZER (manufactured by YOSHIDA KIKAI CO., LTD).

By pre-treating coarse particles with a homogenizer or the like at the stage prior to the treatment by the disperser, it is possible to sharpen the particle distribution even more, which leads to improvements in image density and jetting stability.

The obtained dispersion liquids (the first dispersion liquid in which the first carbon black surface-treated with the anionic surfactant is dispersed in water, and the second dispersion liquid in which the second carbon black coated with the resinous polymer is dispersed in water) for use in the present invention can particularly suitably used for a pigment ink for inkjet recording.

The beads used in the dispersers are usually ceramic beads, and generally, zirconium balls are used. The diameter of the beads is preferably 0.05 mm or less, more preferably 0.03 mm or less.

The average primary particle diameter of the first carbon black is 10.0 nm to 30.0 nm, preferably 15.0 nm to 20.0 nm, and the BET surface area of the first carbon black is $100\,m^2/g$ to $400\,m^2/g$, preferably $150\,m^2/g$ to $300\,m^2/g$.

The average primary particle diameter of the first carbon black can be measured by photographing particles of the first carbon black by means of an electron microscope, and calculating the average primary particle diameter from particle diameters and number of particles on the photograph. Moreover, the BET surface area of the first carbon black can be measured by nitrogen adsorption in accordance with the BET theory.

Since the first carbon black is vulnerable to shocks during dispersion due to being a high structure having a small average primary particle diameter, setting the beads used in the above mentioned disperser to a diameter exceeding 0.05 mm will destroy the structure due to strong shock energy among the beads which in turn leads to a loss in stability of the obtained carbon black dispersion liquid. Thus, it is preferable that the beads used have a diameter of 0.05 mm or less.

One of the features of the inkjet recording ink is to use the first dispersion liquid of the first carbon black in combination with the second dispersion liquid of the second carbon black which is coated with the resinous polymer. The second carbon black coated with the resinous polymer is generally called as a capsule pigment that is a pigment coated with a resin. The capsule pigment has been developed for the purpose of dispersing a pigment in water by giving hydrophilic properties to a surface of the pigment with a resin layer.

Examples of the resinous polymer used for the coating of the second carbon black include polyamides, polyurethanes, polyesters, polyureas, epoxy resins, polycarbonates, urea resins, melamine resins, phenol resins, polysaccharides, gelatin, gum arabic, dextran, casein, proteins, natural rubbers, carboxypolymethylenes, polyvinyl alcohols, polyvinyl pyrrolidones, polyvinyl acetates, polyvinyl chlorides, polyvinylidene chlorides, cellulose, ethyl cellulose, methyl cellulose, nitro cellulose, hydroxyethyl cellulose, cellulose acetate, polyethylenes, polystyrenes, (meth)acrylic acid polymers or copolymers, (meth)acrylate polymers or copolymers, (meth)acrylic acid-(meth)acrylate copolymers, styrene-(meth)acrylic acid copolymers, styrene-maleic acid copolymers, sodium alginate, fatty acids, paraffins, beeswax, water wax, hardened beef tallow, carnauba wax and albumin.

It is also possible to use organic polymers having anionic group such as a carboxyl group or sulfonic group, among the aforementioned polymers. Examples of a nonionic organic polymer thereof include polyvinyl alcohols, polyethylene glycol monomethacrylates, polypropylene glycol monomethacrylates, methoxy polyethylene glycol monomethacrylates and (co)polymers thereof; and cation ring-opening polymers such as 2-oxazolines.

The pigment dispersion liquids (a first dispersion liquid in which the first carbon black is dispersed in water and a second dispersion liquid in which the second carbon black is dispersed in water) for use in the present invention each preferably have a pigment concentration of 5% by mass to 50% by mass relative to the total amount of each dispersion liquid. When the concentration of the pigment is less than 5% by mass, the productivity is lowered. When the concentration thereof is more than 50% by mass, the viscosity of the resulting dispersion liquid of the carbon black (pigment) is excessively high, and thus it may be difficult to disperse the carbon black in water.

The carbon black may be selected from those appropriately synthesized, or the commercial products. Examples of the commercial products thereof include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600 and MCF88 (these products are manufactured by MITSUBISHI CHEMICAL CORPORATION); MONARCH 120, MONARCH 700, MONARCH 800, MONARCH 880, MONARCH 1000, MONARCH 1100, MONARCH 1300, MONARCH 1400, MOGAL L, REGAL 99R, REGAL 250R, REGAL 300R, REGAL 330R, REGAL 400R, REGAL 500R and REGAL 660R (these products are manufactured by CABOT CORPORATION); and PRINTEX A, PRINTEX G, PRINTEX U, PRINTEX V, PRINTEX 55, PRINTEX 140U, PRINTEX 140V, SPECIAL BLACK 4, SPECIAL BLACK 4A, SPECIAL BLACK 5, SPECIAL BLACK 6, SPECIAL BLACK 100, SPECIAL BLACK 250, COLOR BLACK FW1, COLOR BLACK FW2, COLOR BLACK FW2V, COLOR BLACK FW18, COLOR BLACK FW200, COLOR BLACK S150, COLOR BLACK S160 and COLOR BLACK 5170 (these products are manufactured by DEGUSSA Co.). These may be used independently or in combination.

Two or more surfactants may be used in combination in the inkjet recording of the present invention, provided that these surfactants do not adversely affect the characteristics of the resulting ink.

Specific examples of such surfactant used in combination include nonionic surfactants, such as BT series (manufactured by Nikko Chemicals Co., Ltd.); NONYPOL series (manufactured by Sanyo Chemical Industries); D-series, and P-series (manufactured by Takemoto Oil & Fat Co., Ltd.); SURFYNOL series (manufactured by Air Products and Chemicals, Inc.); OLFINE series (manufactured by Nissin Chemical Industry Co., Ltd.), EMALEX DAPE series (manufactured by Nihon-Emulsion Co., Ltd.), silicone surfactants (e.g. silicone surfactants manufactured by Dow Corning Toray Co., Ltd.), and fluorosurfactants (e.g. fluorosurfactants manufactured by NEOS COMPANY LIMITED, Sumitomo 3M Limited, DuPont, and Daikin Industries, Ltd.).

The inkjet recording ink can be prepared in accordance with a conventional method known in the art. For example, the inkjet recording ink is prepared by mixing and stirring the dispersion liquids of the carbon black, water, the water-soluble organic solvent, the surfactant, and the like, filtering the mixture through a filter, or by means of a centrifugal separator to remove coarse particles, and optionally degassing.

The concentration of the carbon black in the ink is preferably 1% by mass to 20% by mass relative to the total amount of the ink. When the concentration of the ink is less than 1% by mass, image density of resulting images is low, and thus vividness may not be attained on a resulting pint. When the concentration thereof is more than 20% by mass, the viscosity of the resulting ink tends to be high, and also the resulting ink easily causes clogging of a nozzle.

The water-soluble organic solvent is suitably selected depending on the intended purpose without any restriction. Examples thereof include: polyhydric alcohols such as ethylene glycol, diethylene glycol, 1,3-butylglycol, 3-methyl-1,3-butylglycol, triethylene glycol, polyethylene glycol, polypropylene glycol, 1,5-pentanediol, 1,6-hexanediol, glycerin, 1,2,6-hexanetriol, 2-ethyl-1,3-hexanediol, 1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ether such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amides such as formamide, N-methylformamide, N,N-dimethylformamide; amines such as monoethanol amine, diethanol amine, triethanol amine, monoethyl amine, diethyl amine, and triethyl amine; sulfone-containing compounds such as dimethyl sulfoxide, sulfolane, and thiodiethanol; and others such as propylene carbonate, and ethylene carbonate. These may be used independently or in combination.

Among them, 1,3-butylglycol, diethylene glycol, triethylene glycol, and glycerin are particularly preferable, because use of any of these prevents clogging of a nozzle due to the dried ink, that is, to prevent jetting failure due to evaporation of moisture, and improves image density of resulting images.

An amount of the water-soluble organic solvent is preferably 0% by mass to 50% by mass, more preferably 5% by mass to 40% by mass, and even more preferably 10% by mass to 35% by mass relative to the total amount of the ink.

Since the inkjet recording ink of the present invention contains 2-ethyl-1,3-hexanediol (EHD), permeability of the ink improves, and the resulting ink prevents bleeding as the pigments are remained on a surface of a recording medium. Therefore, a printed image having high image density and not causing strike-through can be obtained. In addition to this, jetting stability of the ink is enhances as EHD is used in combination of the aforementioned mixture of the pigments (the first carbon black and the second carbon black).

An amount of the 2-ethyl-1,3-hexanediol (EHD) contained in the ink is preferably 0.1% by mass to 10.0% by mass, more preferably 1.5% by mass to 5.0% by mass. When the amount thereof is less than 0.1% by mass, a sufficient effect of EHD cannot be exhibited. When the amount thereof is more than 10.0% by mass, the reliability of the ink may degrease as EHD itself has low solubility.

The inkjet recording ink of the present invention contains particles formed of the anionic self-emulsifying poly(ether urethane) resin.

The anionic self-emulsifying poly(ether urethane) resin can be synthesized, for example, by allowing polyol such as glycol to react with diisocyanate such as bidunctional isocyanate.

Moreover, functional groups such as a carboxyl group, amino group, and the like can be used in combination to the above for the synthesis, and by using such functional groups in combination, the anionic self-emulsifying poly(ether urethane) of various characteristics can be attained. The acid value of the anionic self-emulsifying poly(ether urethane) resin can be controlled by adjusting the functional groups (carboxyl group, amino group) for use. For example, the acid values thereof can be increased by increasing the number of the carboxyl groups. The acid value of anionic self-emulsifying poly(ether urethane) is preferably 40 mgKOH/g to 120 mgKOH/g. When the acid value thereof is less than 40 mgKOH/g, the resulting ink has poor storage stability. When the acid value thereof is more than 120 mgKOH/g, the viscosity of the resulting ink is high, which lowers the jetting stability of the ink.

The anionic self-emulsifying poly(ether urethane) resin is particularly preferably used for attaining excellent water resistance and fixing ability of a resulting formed image, and giving excellent storage stability to the inkjet recording ink when it is added to the ink.

Use of the anionic self-emulsifying poly(ether urethane) resin as a component of the inkjet recording ink is disclosed in JP-A Nos. 2009-067907, 2009-173805, and 2009-161726.

To the inkjet recording ink of the present invention, various additives can be added, as well as water. For example, a water-soluble organic medium can be added to the inkjet recording ink of the present invention, and examples of such water-soluble organic medium include: alcohols such as methanol, ethanol, 1-propanol, and 2-propanol; polyhydric alcohols such as ethylene glycol, diethylene glycol, triethylene glycol, propylene glycol, and glycerin; pyrrolidone derivatives such as N-methylpyrrolidone, and 2-pyrrolidone; ketones such as acetone, and methylethyl ketone; and alkanol amines such as monoethanol amine, diethanol amine, and triethanol amine.

Moreover, the aforementioned additives include: various surfactants such as a nonionic surfactant, an anionic surfactant, a cationic surfactant, and an amphoteric surfactant; and an antiseptic agent.

The inkjet recording ink obtained in the aforementioned manner can attain its moisture retention ability and wetting ability, and as a result, the inkjet recording ink can realize excellent storage stability without causing aggregations of the coloring material, or increasing the viscosity thereof, even if the inkjet recording ink is stored for a long period. Moreover, the inkjet recording ink can maintain its fluidity for a long period without being dried and solidified, even if the inkjet recording ink is left exposed at an edge of a nozzle of an inkjet printer, or the like. Furthermore, the inkjet recording ink gives excellent jetting stability without causing clogging of a nozzle during printing, or when a printing operation is restarted after being interrupted for a while.

The inkjet recording ink of the present invention is suitably used in an ink cartridge in which the ink is housed, as mentioned later. Moreover, the inkjet recording ink of the present invention can form an image by being jetted to a recording medium such as paper by means of an inkjet recording device, as explained later.

(Ink Cartridge)

The ink cartridge of the present invention contains a container, and the inkjet recording ink of the present invention housed in the container.

The structure, size, material, and the like of the container are suitably selected depending on the intended purpose without any restriction. Preferable examples thereof include a container containing an ink bag formed of an aluminum laminated film, resin film or the like, and a plastic case.

The ink cartridge of the present invention houses the inkjet recording ink of the present invention therein, and can be detachably mounted in various recording devices. It is particularly preferred that the ink cartridge of the present invention be detachably mounted in the inkjet recording device of the present invention, which will be explained below.

(Inkjet Recording Device and Inkjet Recording Method)

The inkjet recording device of the present invention contains an inkjet unit configured to apply stimuli to the inkjet recording ink of the present invention to eject the ink as jets so as to record an image, and may further contain other units, if necessary.

The inkjet recording method of the present invention contains: applying stimuli to the inkjet recording ink of the present invention to eject the ink as jets so as to record an image, and may further contain other steps, if necessary.

As the inkjet unit, there are a continuous inkjet unit and a drop-on-demand inkjet unit. Examples of the drop-on-demand inkjet unit include those of a piezo system, a thermal system, and an electrostatic system. Among them, the inkjet units of the piezo system and thermal system are particularly preferable.

The piezo system uses a piezoelectric element as a pressure generating unit configured to compress an ink within an ink flow channel to change a shape of a vibration plate constituting a wall of the ink flow channel so that the volume within the ink flow channel is changed to thereby eject droplets of the ink (see JP-A No. 02-51734).

The thermal system uses a heat element to heat an ink within an ink flow channel to form air bubbles, to thereby eject droplets of the ink (see JP-A No. 61-59911).

The electrostatic system uses a vibration plate constituting a wall of an ink flow channel and an electrode provided to face the vibration plate. The electrostatic system use electrostatic force generated between the vibration plate and the electrode to change a shape of the vibration plate so that a volume within the ink flow channel is changed to thereby eject droplets of the ink (see JP-A No. 06-71882).

The stimuli can be generated, for example, by a stimulation generating unit. The stimuli is suitably selected depending on the intended purpose without any restriction, and examples thereof include heat (temperature), pressure, vibrations, and light. These may be used independently or in combination. Among them, heat and pressure are preferable as the stimuli for use.

Examples of the stimulation generating unit include a heating device, a compressing device, a piezoelectric element, a vibration generating device, an ultrasonic wave oscillator, and a light. Specific examples thereof include: a piezoelectric actuator such as a piezoelectric element; a thermal actuator using a phase change due to film boiling of a fluid by means of an electricity-heat conversion element, such as a heat element; a shape-memory alloy actuator using a phase change of metal due to a temperature change; and an electrostatic actuator using electrostatic force.

An embodiment of jets of the inkjet recording ink is not particularly restricted, and is varied depending on the stimuli applied. For example, in the case where the stimuli is heat, a thermal energy corresponding to a recording signal is applied to the inkjet recording ink in a recording head, for example, by a thermal head, the inkjet recording ink generates air bubbles owing to the applied thermal energy, the generated air bubbles increase the pressure, and by such pressure droplets of the inkjet recording ink are ejected from nozzle openings of the recording head. In the case where the stimuli is pressure, for example, voltage is applied to a piezoelectric element bonded to the area, which is called a pressure chamber, within an ink flow channel of a recording head, to thereby bend the piezoelectric element, and as a result the volume within the pressure chamber decreases so that droplets of the inkjet recording ink are ejected from nozzle openings of the recording head.

When an image is recorded on a recording medium by the inkjet recording device of the present invention in which the inkjet recording ink of the present invention is housed, recorded matter formed of the ink is provided on the recording medium on demand. Moreover, the inkjet recording ink can be supplied by replacing an ink cartridge itself.

EXAMPLES

The present invention will be specifically explained with reference to examples hereinafter, but these examples shall not be construed as limiting the scope of the present invention in any way. Note that, "part(s)" described in the following examples are all on mass basis.

<Measurement of Average Particle Diameter of Pigment Dispersion>

A volume average particle diameter ($D_{50}$) of particles in a pigment dispersion liquid was measured by means of a particle size analyzer (UPA150EX, manufactured by NIKKISO CO., LTD.).

Examples 1 to 15 and Comparative Examples 1 to 8

Inkjet recording inks were prepared with the respective formulations of Examples 1 to 15 and Comparative Examples 1 to 8 presented in Table 2. Each of these inks was then stirred for 1 hour, followed by being filtered through a membrane filter having an opening diameter of 0.8 μm to thereby prepare inkjet recording inks of Nos. 1 to 23. Note that, EHD is an abbreviation of 2-ethyl-1,3-hexanediol.

[Preparation of Dispersion of First Carbon Black Surface-Treated with Anionic Surfactant] (First Dispersion)
—Dispersion (A)—
(Formulation)

| | |
|---|---|
| Carbon black, NIPEX150-IQ (manufactured by DEGUSSA CO., gas black) | 200 parts |
| Sodium naphthalene sulfonate-formaldehyde condensate (Pionin A-45-PN, manufactured by Takemoto Oil & Fat Co., Ltd.) (total amount of dimmers, trimers, and tetramers of naphthalene sulfonic acid: 30%) | 50 parts |
| Distilled water | 750 parts |

After pre-mixing aforementioned ingredients, the mixture was dispersed for 15 minutes by means of a bead mill disperser (UAM-015, manufactured by Kotobuki Industries Co., Ltd.) using zirconium beads (density: $6.03 \times 10^{-6}$ g/m$^2$) each having a diameter of 0.03 mm, at the peripheral speed of 10 m/s and the fluid temperature of 30° C. Thereafter, the dispersion was subjected to centrifugal separation by means of a centrifugal separator (Model-3600, manufactured by KUBOTA Corporation) to remove coarse particles, to thereby obtain a dispersion (A) of a surface-treated carbon black with the anionic surfactant, which had the average particle diameter of 75 nm.

—Dispersion (B)—

Dispersion (B) was obtained in the same manner as in Dispersion (A), provided that the duration of the dispersion was changed from 15 minutes to 30 minutes, and the average particle diameter of the carbon black surface-treated with the anionic surfactant was changed to 50 nm.

—Dispersion (C)—

Dispersion (C) was obtained in the same manner as in Dispersion (A), provided that the duration of the dispersion was changed from 15 minutes to 10 minutes, and the average particle diameter of the carbon black surface-treated with the anionic surfactant was changed to 100 nm.

[Preparation of Dispersion Liquid of Second Carbon Black Coated with Resinous Polymer] (Second Dispersion)
—Dispersion (D)—

After sufficiently replacing the inner atmosphere of a 1 L-flask equipped with a mechanical agitator, a thermometer, a nitrogen gas induction tube, a refluxing tube, and a dropping funnel with nitrogen gas, 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by TOUAGOUSEI CO., LTD), and 0.4 g of mercapto ethanol were added, and heated to 65° C.

Next, a mixture solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6, manufactured by TOUAGOU CO., LTD), 3.6 g of mercapto ethanol, 2.4 g of azobisdimethyl(valeronitrile) and 18 g of methyl ethyl ketone was added dropwise to the flask for 2.5 hours. After completion of dropwise addition, a mixture solution of 0.8 g of azobisdimethyl(valeronitrile) and 18 g of methyl ethyl ketone was added dropwise to the flask for 0.5 hours. The resultant mixture was then matured for 1 hour at 65° C. Thereafter, 0.8 g of azobisdimethyl(valeronitrile) was added to the flask, followed by maturing for 1 hour. After completion of reaction, 364 g of methyl ethyl ketone was added thereto, to thereby prepare 800 g of a polymer solution having a concentration of 50% by mass.

After sufficiently stirring 28 g of the above-prepared polymer solution, 26 g of carbon black, 13.6 g of a 1 mol/L potassium hydroxide solution, 20 g of methyl ethyl ketone and 30 g of ion exchange water, the resultant was kneaded by means of a three roll mill. The resulted paste was added to 200 g of ion exchanged water, followed by sufficiently stirred. Thereafter, methylethyl ketone and water were evaporated away using an evaporator, and the resultant was pre-mixed, and then dispersed for 15 minutes by means of a bead mill separator (UAM-015, manufactured by Kotobuki Industries Co., Ltd.) using zirconium beads (density: $6.03 \times 10^{-6}$ g/m$^2$) each having a diameter of 0.03 mm, at the peripheral speed of 10 m/s and the fluid temperature of 30° C. The resulted dispersion was then subjected to centrifugal separation by means of a centrifugal separator (Model-3600, manufactured by KUBOTA Corporation) to remove coarse particles, to thereby obtain Dispersion (D) pf the resinous polymer-coated carbon black having the average particle diameter of 125 nm.

—Dispersion (E)—

Dispersion (E) was obtained in the same manner as in Dispersion (D), provided that the duration of the dispersion was changed from 15 minutes to 20 minutes, and the average particle diameter of the resinous polymer-coated carbon black was changed to 100 nm.

—Dispersion (F)—

Dispersion (F) was obtained in the same manner as in Dispersion (D), provided that the duration of the dispersion was changed from 15 minutes to 10 minutes, and the average particle diameter of the resinous polymer-coated carbon black was changed to 150 nm.

—Dispersion (G)—

Dispersion (G) was obtained in the same manner as Dispersion (A), provided that the dispersing agent (sodium naphthalene sulfonate-formaldehyde condensate) used in Dispersion (A) was changed to HITENOL 18E(anionic surfactant, manufactured by DAI-ICHI KOGYO SEIYAKU CO., LTD.).

—Dispersion (H)—

Dispersion (H) was obtained in the same manner as in Dispersion (A), provided that the dispersing agent (sodium naphthalene sulfonate-formaldehyde condensate) used in Dispersion (A) was changed to a compound expressed by the following general formula (1).

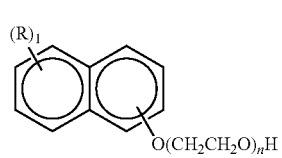

General formula (1)

In the general formula (I), R is a C1-20 alkyl group, a C1-20 alkyl group, or a C1-20 aralkyl group; 1 is an integer of 0 to 7; and n is an integer of 20 to 200.

[Preparation of Pigment Dispersion]

The first dispersion (the dispersion of the first carbon black which was surface-treated with the anionic surfactant) and the second dispersion (the dispersion of the second carbon black, which was coated with the resinous polymer) were mixed at the ratios shown in Table 2 to thereby prepare a pigment dispersion.

[Formulation of Ink]

| | |
|---|---|
| Pigment dispersion (in the case where the concentration of the pigment is 20%, the total solid content is 8%) | 40.0 parts |
| Glycerin | 20.0 parts |
| Diethylene glycol | 10.0 parts |
| 2-ethyl-1,3-hexanediol | 0.1 parts to 10 parts |
| 2-pyrrolidone | 3.0 parts |
| Resin emulsion | 2.0 parts |
| Distilled water | balance |

As the resin emulsion, the polyurethane resin shown in Table 1 was used.

TABLE 1

| Polyurethane resin | Ionic type | Structure | Acid value |
|---|---|---|---|
| Resin I | Anionic self-emulsifying | Ether | 66 |
| Resin II | Anionic self-emulsifying | Ether | 40 |
| Resin III | Anionic self-emulsifying | Ether | 120 |

TABLE 1-continued

| Polyurethane resin | Ionic type | Structure | Acid value |
|---|---|---|---|
| Resin IV | Anionic self-emulsifying | Ether | 30 |
| Resin V | Anionic self-emulsifying | Ether | 130 |
| Resin VI | Anionic self-emulsifying | Carbonate | 60 |
| Resin VII | Cationic self-emulsifying | Ether | 60 |

In Table 1, Resins I to V are manufactured by Mitsui Chemicals Inc., and Resins VI and VII are manufactured by DAIICHI KOUGYOU SEIYAKU CO., LTD.

Using the polyurethane resin shown in Table 1, an ink was prepared. The obtained ink was stirred for 30 minutes, filtered through a membrane filter having an opening diameter of 0.8 μm, followed by subjected to vacuum deaeration, to thereby obtain each of inkjet recording inks of Examples and Comparative Examples shown in Table 2.

TABLE 2

| | Ink | D-A | D-B | D-A/D-B | amount of EHD (parts) | Polyurethane |
|---|---|---|---|---|---|---|
| Ex. 1 | No. 1 | A | D | 50/50 | 3.0 | Resin I |
| Ex. 2 | No. 2 | B | D | 50/50 | 3.0 | Resin I |
| Ex. 3 | No. 3 | C | D | 50/50 | 3.0 | Resin I |
| Ex. 4 | No. 4 | A | E | 50/50 | 3.0 | Resin I |
| Ex. 5 | No. 5 | A | F | 50/50 | 3.0 | Resin I |
| Ex. 6 | No. 6 | A | D | 50/50 | 0.1 | Resin I |
| Ex. 7 | No. 7 | A | D | 50/50 | 10 | Resin I |
| Ex. 8 | No. 8 | A | D | 50/50 | 0.05 | Resin I |
| Ex. 9 | No. 9 | A | D | 50/50 | 12 | Resin I |
| Ex. 10 | No. 10 | A | D | 50/50 | 3.0 | Resin II |
| Ex. 11 | No. 11 | A | D | 50/50 | 3.0 | Resin III |
| Ex. 12 | No. 12 | A | D | 50/50 | 3.0 | Resin IV |
| Ex. 13 | No. 13 | A | D | 50/50 | 3.0 | Resin V |
| Ex. 14 | No. 14 | A | D | 10/90 | 3.0 | Resin I |
| Ex. 15 | No. 15 | A | D | 90/10 | 3.0 | Resin I |
| Comp. Ex. 1 | No. 16 | G | D | 50/50 | 3.0 | Resin I |
| Comp. Ex. 2 | No. 17 | H | D | 50/50 | 3.0 | Resin I |
| Comp. Ex. 3 | No. 18 | A | D | 50/50 | 3.0 | Resin VI |
| Comp. Ex. 4 | No. 19 | A | D | 50/50 | 3.0 | Resin VII |
| Comp. Ex. 5 | No. 20 | A | D | 5/95 | 3.0 | Resin I |
| Comp. Ex. 6 | No. 21 | A | D | 95/5 | 3.0 | Resin I |
| Comp. Ex. 7 | No. 22 | A | D | 100/0 | 3.0 | Resin I |
| Comp. Ex. 8 | No. 23 | A | D | 0/100 | 3.0 | Resin I |

In Table 2, "D-A" means a dispersion liquid A of a surfactant treated carbon black, "D-B" means a dispersion liquid B of a resin-coated carbon black, and "D-A/D-B" means a mixing ratio of the dispersion liquid A to the dispersion liquid B.

Each of inkjet recording ink Nos. 1 to 23 was filled in an ink pack for an inkjet printer IPSiO GX5000, manufactured by Ricoh Company Limited to thereby prepare an ink cartridge.

Using the prepared ink cartridge, an image was printed on plain paper for photocopying, XEROX4200, manufactured by Xerox Corporation, and the printed image was measured by Xrite densitometer. The jetting stability and storage stability of the ink were also evaluated in the following manners. The results are shown in Table 3.

<Evaluation 1: Evaluation of Image>

Evaluation of the image density of the printed image was carried out by measuring the image density of a solid image formed in an image sample by means of the Xrite densitometer.

A: 1.30 or more
B: 1.20 or more but less than 1.30
C: Less than 1.20

<Evaluation 2: Evaluation of Jetting Stability>

A printer was placed in a constant temperature-humidity bath an inner atmosphere of which was set at 32° C. in temperature and 30% RH in humidity, and the printing pattern chart described below was continuously printed on 20 pieces of paper, followed by resting for 20 minutes without printing. This operation was carried out 50 times to thereby print 1,000 pieces in total. Thereafter, a nozzle plate was observed under a microscope and whether or not there was depositions of the ink on the nozzle plate was judged.

—Printing Pattern Chart—

A printing pattern for use is a chart having a printing area of 5% in each color within an imaging region, relative to the total area of paper. This printing pattern was printed at 100% duty for each ink. The printing conditions were such that the recording density was 300 dpi, and the printing mode was one pass printing.

—Evaluation Criteria of Existence of Depositions—

A: There was no deposition of the ink adjacent to the nozzle.
B: There was a slight deposition of the ink adjacent to the nozzle.
C: There were depositions of the ink adjacent to the nozzle.

<Evaluation 3: Evaluation of Storage Stability of Ink>

Each of the inks was placed in a polyethylene container, and the container was sealed. After storing the ink at 70° C. for 3 weeks, particle diameters, surface tension, and viscosity of the ink were measured, and the rate of change from the initial physical properties was evaluated based on the following evaluation criteria.

A: 10% or less
B: 30% or less but more than 10%
C: More than 30%

TABLE 3

|  | Evaluation 1 Image | Evaluation 2 Jetting stability | Evaluation 3 Storage stability |
| --- | --- | --- | --- |
| Ex. 1 | A | A | A |
| Ex. 2 | A | A | A |
| Ex. 3 | A | A | A |
| Ex. 4 | A | A | A |
| Ex. 5 | A | A | A |
| Ex. 6 | B | A | A |
| Ex. 7 | A | A | B |
| Ex. 8 | B | A | A |
| Ex. 9 | A | A | B |
| Ex. 10 | A | A | B |
| Ex. 11 | A | B | A |
| Ex. 12 | A | A | B |
| Ex. 13 | A | B | A |
| Ex. 14 | A | A | A |
| Ex. 15 | A | A | A |
| Comp. Ex. 1 | B | C | C |
| Comp. Ex. 2 | C | C | C |
| Comp. Ex. 3 | B | B | C |
| Comp. Ex. 4 | B | B | C |
| Comp. Ex. 5 | C | A | B |
| Comp. Ex. 6 | A | C | B |
| Comp. Ex. 7 | C | A | C |
| Comp. Ex. 8 | B | C | A |

The invention claimed is:

1. An inkjet recording ink, comprising:
carbon black;
a surfactant comprising an anionic surfactant;
water;
a water-soluble organic solvent; and
particles formed of an anionic self-emulsifying poly(ether urethane) resin, wherein
the carbon black comprises a first carbon black whose surface has been treated with said anionic surfactant, and a second carbon black which is a capsule pigment coated with a resinous polymer,
a mass ratio of the first carbon black to the second carbon black is from 10/90 to 90/10, and
the anionic surfactant is a naphthalenesulfonic acid-formaldehyde condensate.

2. The ink of claim 1,
wherein the first carbon black has an average particle diameter ($D_{50}$) of from 50 nm to 100 nm, and
the second carbon black has an average particle diameter ($D_{50}$) of from 100 nm to 150 nm.

3. The ink of claim 1,
wherein the water-soluble organic solvent comprises 2-ethyl-1,3-hexanediol, and
an amount of the 2-ethyl-1,3-hexanediol in the ink is from 0.1% by mass to 10% by mass.

4. The ink of claim 3, wherein the amount of the 2-ethyl-1,3-hexanediol in the ink is from 1.5% by mass to 5.0% by mass.

5. The ink of claim 1, wherein the anionic self-emulsifying poly(ether urethane) resin has an acid value of from 40 mgKOH/g to 120 mgKOH/g.

6. The ink of claim 1, wherein the mass ratio of the first carbon black to the second carbon black is from 30/70 to 70/30.

7. The ink of claim 1, wherein a content of the anionic surfactant is from 0.1 to 2 parts by mass relative to 1 part of the first carbon black.

8. The ink of claim 7, wherein the content of the anionic surfactant is from 0.25 to 1 part by mass.

9. The ink of claim 1, wherein a concentration of the carbon black in the ink is from 1% to 20% by mass.

10. The ink of claim 1, wherein the water-soluble organic solvent comprises 1,3-butylglycol, diethylene glycol, triethylene glycol, glycerin, or any combination thereof.

11. The ink of claim 1, wherein a content of the water-soluble organic solvent is from 5% to 40% by mass of a total amount of the ink.

12. An ink cartridge, comprising:
a container; and
an inkjet recording ink housed in the container, wherein the ink comprises carbon black, a surfactant comprising an anionic surfactant, water, a water-soluble organic solvent, and particles formed of an anionic self-emulsifying poly(ether urethane) resin, the carbon black comprises a first carbon black whose surface has been treated with said anionic surfactant, and a second carbon black which is a capsule pigment coated with a resinous polymer, a mass ratio of the first carbon black to the second carbon black is from 10/90 to 90/10, and the anionic surfactant is a naphthalenesulfonic acid-formaldehyde condensate.

13. The ink cartridge of claim 12, wherein the container is an ink bag comprising an aluminum laminated film or a resin film.

14. The ink cartridge of claim 12, wherein the container is a plastic case.

15. An inkjet recording method, comprising:

applying a stimulus to an inkjet recording ink, thereby ejecting the ink as a jet and recording an image, wherein the ink comprises carbon black, a surfactant comprising an anionic surfactant, water, a water-soluble organic solvent, and particles formed of an anionic self-emulsifying poly(ether urethane) resin, the carbon black comprises a first carbon black whose surface has been treated with said anionic surfactant, and a second carbon black which is a capsule pigment coated with a resinous polymer, a mass ratio of the first carbon black to the second carbon black is from 10/90 to 90/10, and the anionic surfactant is a naphthalenesulfonic acid-formaldehyde condensate.

16. A method of producing an inkjet recording ink comprising carbon black, a surfactant, water, a water-soluble organic solvent, and particles formed of an anionic self-emulsifying poly(ether urethane) resin, wherein the carbon black comprises a first carbon black and a second carbon black, a surface of said first carbon black is obtained by a process comprising treating with an anionic surfactant, said second carbon black is a capsule pigment obtained by a process comprising coating with a resinous polymer, a mass ratio of the first carbon black to the second carbon black is from 10/90 to 90/10, and the anionic surfactant is a naphthalenesulfonic acid-formaldehyde condensate.

\* \* \* \* \*